United States Patent [19]

Nagashima

[11] Patent Number: 4,760,455
[45] Date of Patent: Jul. 26, 1988

[54] PICTURE OUTPUT DEVICE

[75] Inventor: Yoshitake Nagashima, Chigasaki, Japan

[73] Assignee: Canon Kabushiki Kaisha, Tokyo, Japan

[21] Appl. No.: 932,772

[22] Filed: Nov. 19, 1986

[30] Foreign Application Priority Data

Nov. 29, 1985 [JP] Japan .................................. 60-269871
Nov. 29, 1985 [JP] Japan .................................. 60-269872
Nov. 29, 1985 [JP] Japan .................................. 60-267259

[51] Int. Cl.$^4$ ............................................. H04N 7/01
[52] U.S. Cl. .................................. 358/242; 358/140; 358/148
[58] Field of Search ................. 358/140, 242, 254, 22, 358/148

[56] References Cited

U.S. PATENT DOCUMENTS

| | | | |
|---|---|---|---|
| 2,751,583 | 6/1956 | Jones | 358/254 |
| 4,402,011 | 8/1983 | Newton | 358/148 |
| 4,414,571 | 11/1983 | Kureha | 358/22 |
| 4,670,784 | 6/1987 | Goldberg | 358/242 |
| 4,672,443 | 6/1987 | Dischert | 358/140 |
| 4,672,445 | 6/1987 | Casey | 358/140 |
| 4,679,091 | 7/1987 | Kikuchi | 358/242 |

*Primary Examiner*—Howard K. Britton
*Attorney, Agent, or Firm*—Robin, Blecker & Daley

[57] ABSTRACT

A picture output device of the present invention receives inputs in the form of a first picture signal with n horizontal scanning lines within the vertical scanning period or a second picture signal with m (m>n) horizontal scanning lines within the vertical scanning period, wherein the first picture signal after received is converted in the number of lines within the vertical scanning period to m, and a picture based on either one of the thus-converted first picture signal and the second picture signal is displayed.

18 Claims, 5 Drawing Sheets

PICTURE OUTPUT DEVICE

BACKGROUND OF THE INVENTION

1. Field of the Invention

This invention relates to picture output devices, and more particularly to picture output devices capable of coping with a plurality of kinds of video signals.

2. Description of the Related Art

The present broadcast television systems are standardized, for example, according to the NTSC, based on an individual picture having 525 horizontal scanning lines with the use of the interlaced scanning technique. By the way, as video printers or the like have been developed, and further as an improvement of the quality for still pictures is demanded, there are increasing opportunities for dealing with a television signal as modified from the NTSC signal by using different scanning methods. For example, a signal of non-interlaced 525 horizontal scanning lines, and another signal of interlaced 1051 horizontal scanning lines have come to be used in television systems.

In the present situation where, as has been mentioned above, the available television signals are of different forms taken independently of each other, when one desires to view one of the other kinds of video signals than that adapted to the receiver he already has, another receiver must be bought. That is, since the shape of the fluorescent screen is usually conformed to the aspect ratio of the video signal, for a video signal whose aspect ratio does not match the used receiver, it will result that either part of the picture cannot be displayed, or part of the area of the screen is not used to display the picture. The former implies that the integral part of the picture information is abandoned. This is by no means desirable. The appearance of a blank along with the picture on the fluorescent screen in the latter case will give an unpleasant impression to the viewer.

To be adaptable to two different kinds of video signals by having the two receivers at hand, the user is obliged to pay a high cost, and further needs to prepare a space they occupy on the shelf or the like. Hence, the user now is encountering a very inconvenient situation.

SUMMARY OF THE INVENTION

An object of the present invention is to provide a picture output device which can eliminate the above-described problems.

Another object is to provide a picture output device capable of receiving inputs of different signal forms from each other to produce good pictures.

Under such objects, according to the present invention, in an embodiment thereof, the picture output device comprises input means receptive of inputting a first picture signal with the horizontal scanning repeated n times within the vertical scanning period, and a second picture signal with the horizontal scanning repeated m (m>n) times within the vertical scanning period, means for converting the scanning so that the number of times the horizontal scanning of the first picture signal inputted from the input means is repeated is converted to m, display means adapted to display a picture based on the second picture signal, and supply means for selectively supplying one of the second picture signal and a picture signal produced from the scanning converting means to the display means.

A further object of the invention is to provide a picture output device capable of receiving at least three different kinds of picture signals from one another to produce a good picture.

Under such an object, according to the present invention, in an embodiment thereof, the picture output device comprises input means capable of receiving a first picture signal with the horizontal scanning repeated n times within the vertical scanning period, a second picture signal with the horizontal scanning repeated m (m>n) times within the vertical scanning period and a different aspect ratio from that of the first picture signal, and a third picture signal with the horizontal scanning repeated k×n times (k is 2 or higher an integer) within the vertical scanning period and an equal aspect ratio to that of the first picture signal, scanning converting means receptive of the first picture signal from the input means for producing an output representing that the number of repetitions of the horizontal scanning within the vertical scanning period has changed to k×n, display means capable of displaying a picture based on the given picture signal, and display operation control means for selectively supplying the second and third picture signals and the converted first picture signal by the scanning converting means to the display means and for controlling the display operation of the display means in accordance with the number of repetitions of the horizontal scanning within the vertical scanning period of the supplied picture signal.

A furthermore object of the invention is to provide a picture output device capable of outputting picture signals of different aspect ratios from each other as pictures of good good quality.

Under such an object, according to the present invention, in an embodiment thereof, the picture output device comprises input means capable of inputting a first picture signal and a second picture signal of different aspect ratio from that of the first picture signal, display means capable of displaying a picture based on the picture signal; discriminating means for determining whether the inputted picture signal on the input means is the first picture signal or the second picture signal, display operation control means for controlling the display operation of the display means in accordance with the result of determination of the discriminating means, and mask means for masking part of the display area of the display means depending on the result of determination of the discriminating means.

These and other objects and features of the invention will become apparent from the following detailed description of embodiments thereof with reference to the accompanying drawings.

DETAILED DESCRIPTION OF THE PREFERRED EMBODIMENTS

The present invention is next described in connection with embodiments thereof by reference to the drawings.

Figure 1:
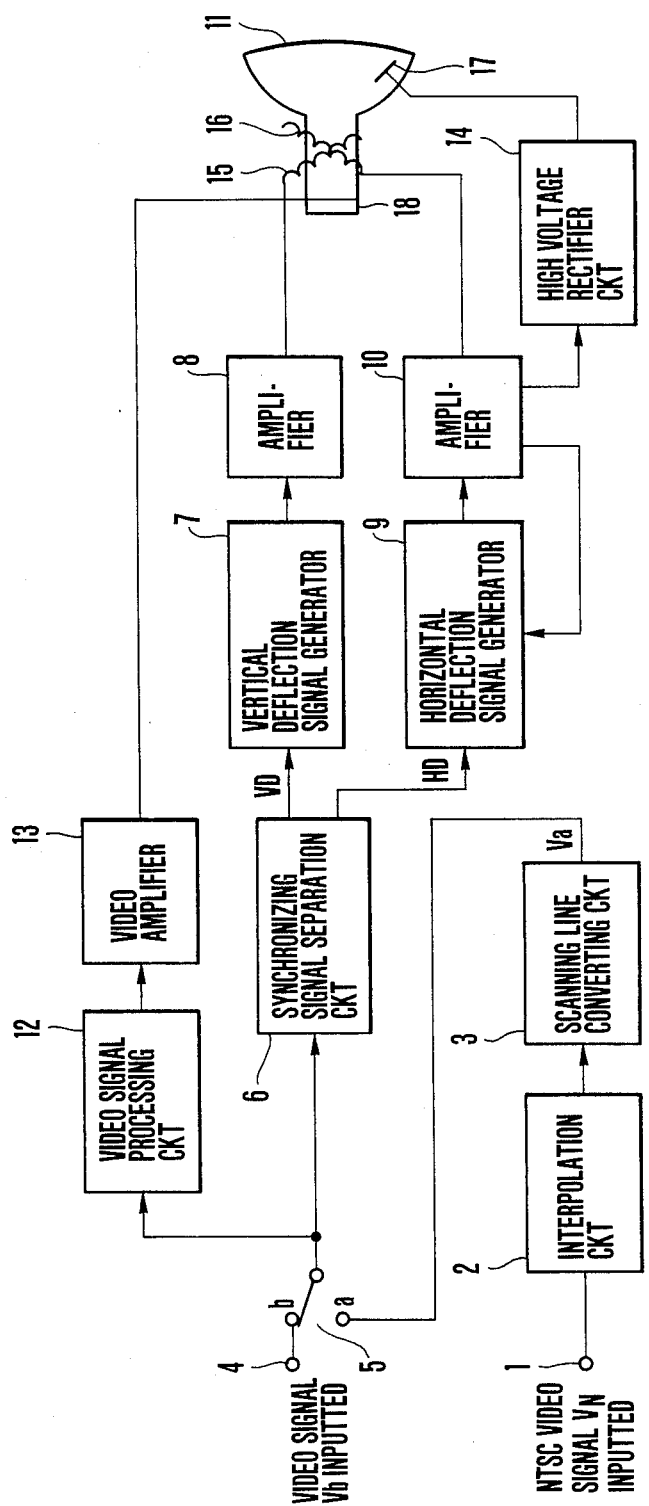
FIG. 1 is a schematic diagram of a first embodiment of the picture output device according to the present invention.

In FIG. 1 there is shown a first embodiment of the invention where the picture output device includes a first input terminal 1 at which a video signal $V_N$ of the NTSC system having 525 scanning lines with 2:1 interlaced scanning enters, an interpolation circuit 2 receptive of the NTSC signal $V_N$ for producing output signals representative of the positions of the scanning lines of the second and first fields from the first and second fields of the NTSC signal respectively by the line interpolation with the result that about 525 horizontal scanning lines for one field of the NTSC signal are obtained, and a scanning line converting circuit 3 for compressing one horizontal scanning period of the output of the interpolation circuit 2 to about one-half to produce a video signal Va with non-interlaced 525 horizontal scanning lines.

A second input terminal 4 at which a video signal Vb with, for example, 1051 lines in 2:1 interlace enters is connected to the opposite throw of a changeover switch 5 to that connected to the output of the circuit 3 so that the aforesaid signals Va and Vb appear selectively at the output thereof. A synchronizing signal separation circuit 6 receptive of the signal Va or Vb from the changeover switch 5 produces a horizontal synchronizing signal (HD) and a vertical synchronizing signal (VD). In synchronism with signal VD separated out by the synchronizing signal separation circuit 6, a vertical deflection signal generator 7 produces a vertical deflection signal, which is then applied to an amplifier 8. A horizontal deflection signal generator 9 of PLL type produces a horizontal deflection signal in synchronism with the signal HD separated out by the synchronizing signal separation circuit 6. Its output is applied to an amplifier 10.

A display means 11 in the form of CRT has its vertical deflection coil 15 supplied with the output of the amplifier 8 and has its horizontal deflection coil 16 supplied with the output of the amplifier 10, so that an electron beam is scanned. A D.C. high voltage from a high voltage rectifier circuit 14 is applied to the anode 17.

A video signal processing circuit 12 performs the same treatment on the video signal in brightness, contrast, etc., as is known in the art. The output of the circuit 12 is applied to a video amplifier 13 the output of which is applied to the cathode 18 of the CRT 11.

In operating the device of FIG. 1, when the first video signal Va is to be outputted, the operator sets the changeover switch 5 in its "a" position. Thereby, the video signal Va having 525 scanning lines in non-interlace is applied to the synchronizing signal separation circuit 6. Therefore, in the vertical deflection signal generator 7, a vertical deflection signal of the same frequency ($f_{VM}$=59.94 Hz) as that of the NTSC signal is obtained, which is applied through the amplifier 8 to the vertical deflection coil 15. Meanwhile, in the horizontal deflection signal generator 9, for the satisfaction of the condition that $f_H$=525$f_V$ where $f_H$ and $f_V$ are the frequencies of the horizontal and vertical deflection signals respectively, a horizontal deflection signal of frequency $f_{HM}$=31.468 KHz equal to 2 times that of the NTSC signal is obtained, which is applied through the amplifier 10 to the horizontal deflection coil 16. Therefore, when the received video signal is of the NTSC system, a picture based on the non-interlaced 525 scanning lines is displayed on the CRT 11 with advantages that the disturbance to the scanning lines is lessened, and the vertical resolution is improved. Thus, a high-quality picture output is obtained.

When the video signal Vb is to be outputted, the changeover switch 5 is moved to its "b" position. Thereby, the video signal Vb having 1051 scanning lines in 2:1 interlace (where the frequency of the vertical synchronizing signal is 59.94 Hz) is applied to the synchronizing signal separation circuit 6. In the vertical deflection signal generator 7, therefore, a vertical deflection signal of frequency $f_{VS}$=59.94 Hz is obtained. Meanwhile, in the horizontal deflection signal generator 9, for the satisfaction of the condition that $f_{HS}$=(1051/2)×$f_V$ where $f_{HS}$ and $f_V$ are the frequencies of the horizontal and vertical deflection signals respectively, a horizontal deflection signal of frequency $f_{HS}$=31.498 KHz is obtained. Thus, a picture of extremely high resolution for high quality is displayed.

For note, $f_{HS}-f_{HM}$=30 Hz (about 0.1% deviation). This difference is very small, falling in the pull-in range of the horizontal deflection signal generator 9. For this reason, there is no need to alter the constants of the peripheral circuits for the picture output device. Hence, with the use of the conventional peripheral circuits left as they are, the device of the invention can operate stably to different forms of television signals. Though it has been stipulated that $f_{HS}$=(1051/2)$f_V$, it is to be understood that the frequency of the horizontal deflection signal can take any of such values as to satisfy $f_{HS}$=(2n+1)$f_V$/2 where n is an integer, provided it lies within the pull-in range of the horizontal deflection signal generator 9.

As has been described above, in the embodiment of the invention, despite the structure of construction is simple, the two kinds of video signal, one of which is the non-interlaced scanning of 525 horizontal lines, and the other of which is the 2:1 interlaced scanning of 1051 horizontal lines can be selectively outputted both as good pictures.

Figure 2:
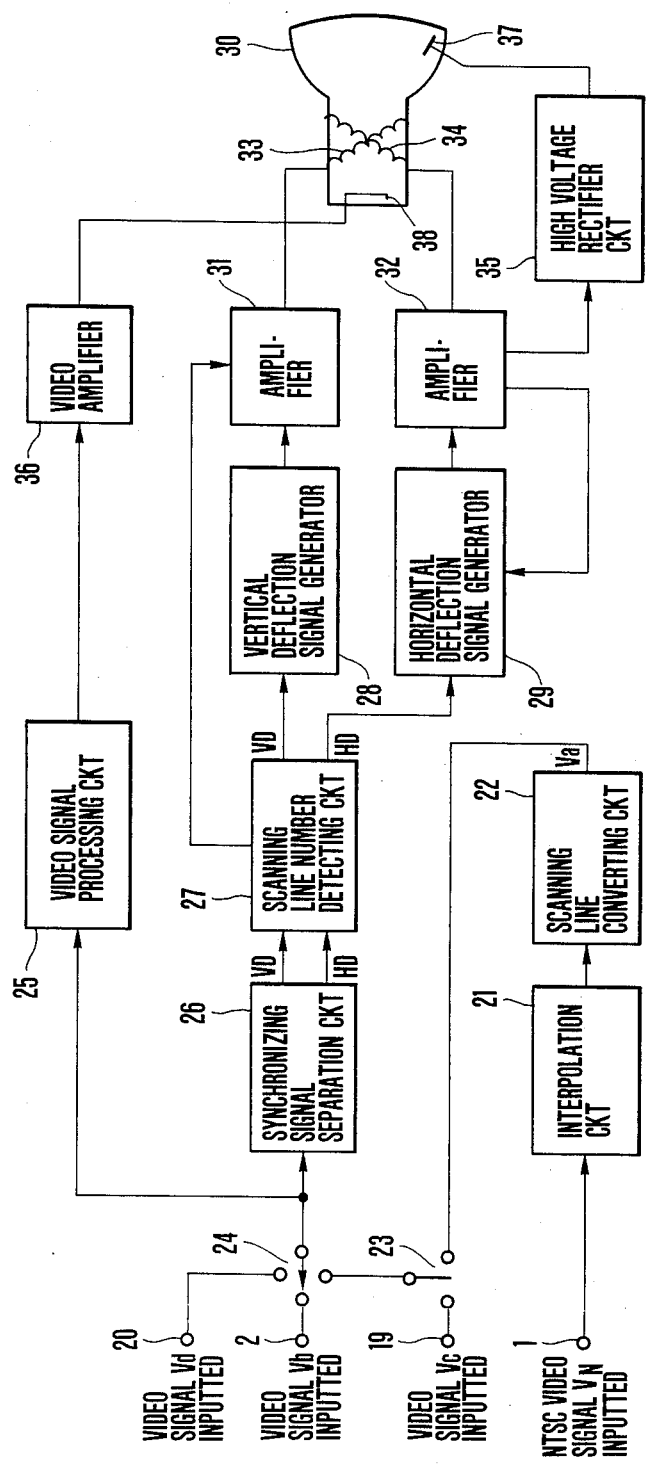
FIG. 2 is a schematic diagram of a second embodiment of the picture output device according to the present invention.

FIG. 2 illustrates a second embodiment of the picture output device according to the invention. A so-called high-definition television signal Vd having 1125 horizontal scanning lines in 2:1 interlace with an aspect ratio of 3:5 enters at an input terminal 20. Another video signal Vb having 1051 horizontal scanning lines in 2:1 interlace with an aspect ratio of 3:4 enters at another input terminal 2. Another video signal Vc having 525 horizontal scanning lines in non-interlace with an aspect ratio of 3:4 enters at another input terminal 19. The usual video signal or NTSC signal $V_N$ having 525 horizontal scanning lines in 2:1 interlace with the aspect ratio of 3:4 enters at another input terminal 1. In the following, the video signals received in the terminals 1, 2, 19 and 20 are represented by $V_N$, Vb, Vc and Vd respectively.

The $V_N$ is applied to the interpolation circuit 21 where from the first and second fields of the video signal of the NTSC system are obtained signals representative of the positions of the scanning lines of the second and first fields respectively by the line interpolation. Thus, for every one field of the video signal of the NTSC system, a signal of about 525 horizontal scanning lines can be obtained. The output of this interpolation circuit 21 is applied to the scanning line converting circuit 22 where one horizontal scanning period is compressed to about $\frac{1}{2}$ whereby a video signal Va of 525 horizontal scanning lines in non-interlace is obtained. Thereby, the signals Vc and Va become exactly the same in the signal form. The video signal Va is supplied through a switch 23 to a switch 24.

From the switch 24, one of the video signals Va, Vb, Vc and Vd is produced, being supplied to the video signal processing circuit 25 and to the synchronizing signal separation circuit 26.

In the synchronizing signal separation circuit 26, vertical and horizontal synchronizing signals (VD) and (HD) are separated out. The signals VD and HD, from the synchronizing signal separation circuit 26 are applied to a scanning line number detecting circuit 27 for detecting the number of scanning lines, where whether the given video signal is the signal Vd or the others is determined based on the number of the signals HD lying between the successive two signals VD.

The signals VD and HD further go to vertical and horizontal deflection signal generators 28 and 29, respectively. It is to be noted here that since the frequency of the signal VD of the video signal Vd or the high-grade television signal is 60 Hz, for the signals Vb, Vc and Va whose frequencies are 59.94 Hz, because their differences are very small, the same vertical deflection signal generator may be used. Also, since the frequency of the signal HD of the video signal Vd is 33.750 KHz, the frequency of the signal HD of the video signal Vb is 31.498 KHz, and the frequency of the signal HD of the video signal Vc or Va is 31.468 KHz, they can all fall in the pull-in range of the horizontal synchronizing AFC circuit of known structure. Therefore, the horizontal deflection signal generator 29 also can cope with any of these video signals without having to change its circuit constants depending on the signal. The outputs of these generators 28 and 29 are of the saw-tooth wave form in synchronism with the signals VD and HD respectively.

Next the aspect ratio will be explained. Now assuming that the CRT 30 is adapted to the video signal of an aspect ratio of 3:4, then if the input signal is one of the signals Vb, Vc and $V_N$, the picture output can be carried out in the prior known way. That is, the saw-tooth wave signals obtained from the vertical and horizontal deflection signal generators 28 and 29 after having been amplified by amplifiers 31 and 32 are applied to the vertical and horizontal deflection coils 33 and 34 when an electron beam scans the fluorescent screen of the CRT 30. 35 is a high voltage rectifier circuit for producing a high D.C. voltage which is applied to the anode 37 of the CRT 30.

Figure 3:
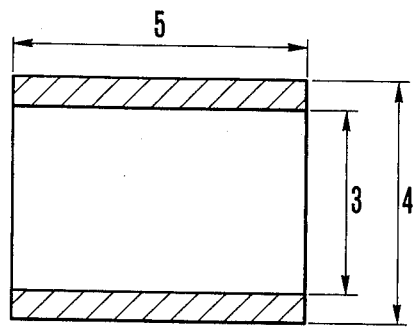
FIG. 3 is a diagram of geometry taken to explain what picture is displayed by the device of FIG. 2 which has a cathode-ray tube (CRT) adapted to the video signal of an aspect ratio of 3:4 when another kind of video signal with the aspect ratio of 3:5 is inputted.

Assuming again that the input signal is determined to be the signal Vd by the scanning line number detecting circuit 27, then the aspect ratio is adjusted by changing the mu-factor of the amplifier 31 to $\frac{3}{4}$ of the usual value. Thereby, the vertical deflection of the electron beam becomes $\frac{3}{4}$ times as wide as the usual. As shown in FIG. 3, therefore, a video signal whose aspect ratio is 3:5 is outputted for a picture. In FIG. 3, the hatched portions of the area of the fluorescent screen of the CRT 30 are not scanned by the electron beam, while the white portion is scanned by it.

The video signal produced from the switch 24 is supplied to the video signal processing circuit 25 where it is treated in the known manner and the contrast and color value are controlled. The output of the circuit 25 is applied through the video amplifier 36 to the cathode 38 of the CRT 30.

Figure 4:
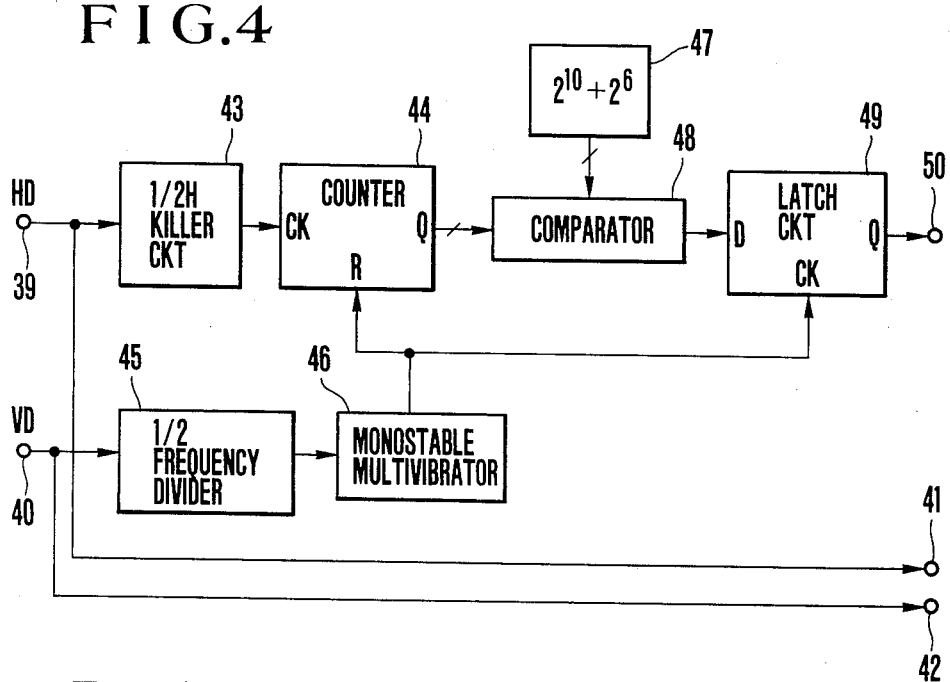
FIG. 4 is a diagram of a practical example of the scanning line detecting circuit of FIG. 2.

FIG. 4 illustrates a concrete example of the construction of the scanning line number detecting circuit 27 in FIG. 2. The signals HD and VD from the synchronizing signal separation circuit 26 enter at input terminals 39 and 40 respectively, and exit from output terminals 41 and 42 to the deflection signal generators 29 and 28 respectively.

A $\frac{1}{2}$ H killer circuit 43 for removing those of the equivalent pulses generated during the period of the signal VD which are out of synchronism with the signal HD and occur in the timing deviated from the signal HD by $\frac{1}{2}$ of the horizontal scanning period, produces an output which is applied to a counter 44 at its CK terminal. Meanwhile, the signal VD is applied to a $\frac{1}{2}$ frequency divider 45, from which is obtained a signal with its period equal to that of the two fields, or one frame of the interlaced signal. This one-frame period recycle signal is supplied to a monostable multivibrator 46 which in turn produces a pulse of duration of 1 μsec. or thereabout for every two vertical scanning periods. This pulse is applied to the reset (R) terminal of the counter 44 and to the CK terminal of a latch circuit 49.

The output of the counter 44 is supplied to a comparator 48 where it is compared with a desired one of the values between 1052 and 1124 inclusive, in this instance, 1088 ($=2^{10}+2^6$) for the purpose of simplifying the structure of a data generator 47. The output of the comparator 48 which occurs just before the counter 44 is reset is latched by the latch circuit 49 and is supplied as the output of the scanning line number detecting circuit 27 from an output terminal 50 to the amplifier 31. That is, when the video signal Vd, for example, is inputted, the output of the counter 44 exceeds the output of the data generator 47, causing the comparator 48 to produce an output of high level. Thus, the output from the terminal 50 is always Hi. When any of the signals Vb, Vc and $V_N$ is inputted, the output from the terminal 50 is always low level.

Responsive to change of the signal representing the detected number of scanning lines from the low to high level, the amplifier 31 changes its gain to $\frac{3}{4}$ of the value for the low level output.

Next, another case wherein as the CRT 30 use is made of a CRT adapted to the high-definition television signal, or the video signal whose aspect ratio is 3:5 will be explained. For this case, only when the input signal is the signal Vd, the usual picture output can be performed. When the input signal is the signal Vb, Vc, or $V_N$, the gain of the amplifier 32 for amplifying the output of the horizontal deflection signal generator 29 is changed to 4/5 of the normal value. The others are similar in construction and arrangement to those of FIG. 2. For example, if the scanning line number detecting circuit 27 is of the same form as that shown in FIG. 4, for its output of low level, the gain of the amplifier 32 is changed to 4/5 of the value taken when its output is high.

Figure 5:
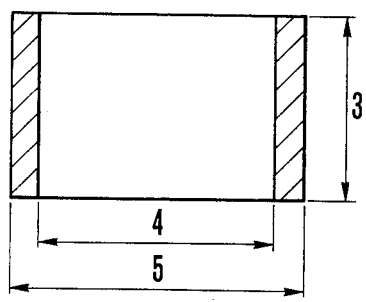
FIG. 5 is a diagram of geometry taken to explain what picture is displayed by a CRT adapted to the video signal of 3:5 in the aspect ratio when another kind of video signal whose aspect ratio is 3:4 is inputted to the device.

By the above-described modification, the CRT adapted for use with the high-definition television signal is made usable for displaying a different kind of video signal whose aspect ratio is 3:4 at a white portion of the area of the fluorescent screen shown in FIG. 5, leaving the left and right hand margins blank.

According to the picture output device of the character described above, for the input of any of the four kinds of video signals of different forms from one another, one and the same CRT is enough to produce their pictures selectively. What aspect ratio the received video signal has can be detected automatically by sensing the number of horizontal scanning lines within the vertical scanning period. Thus, the picture is displayed without deformation.

Figure 6:
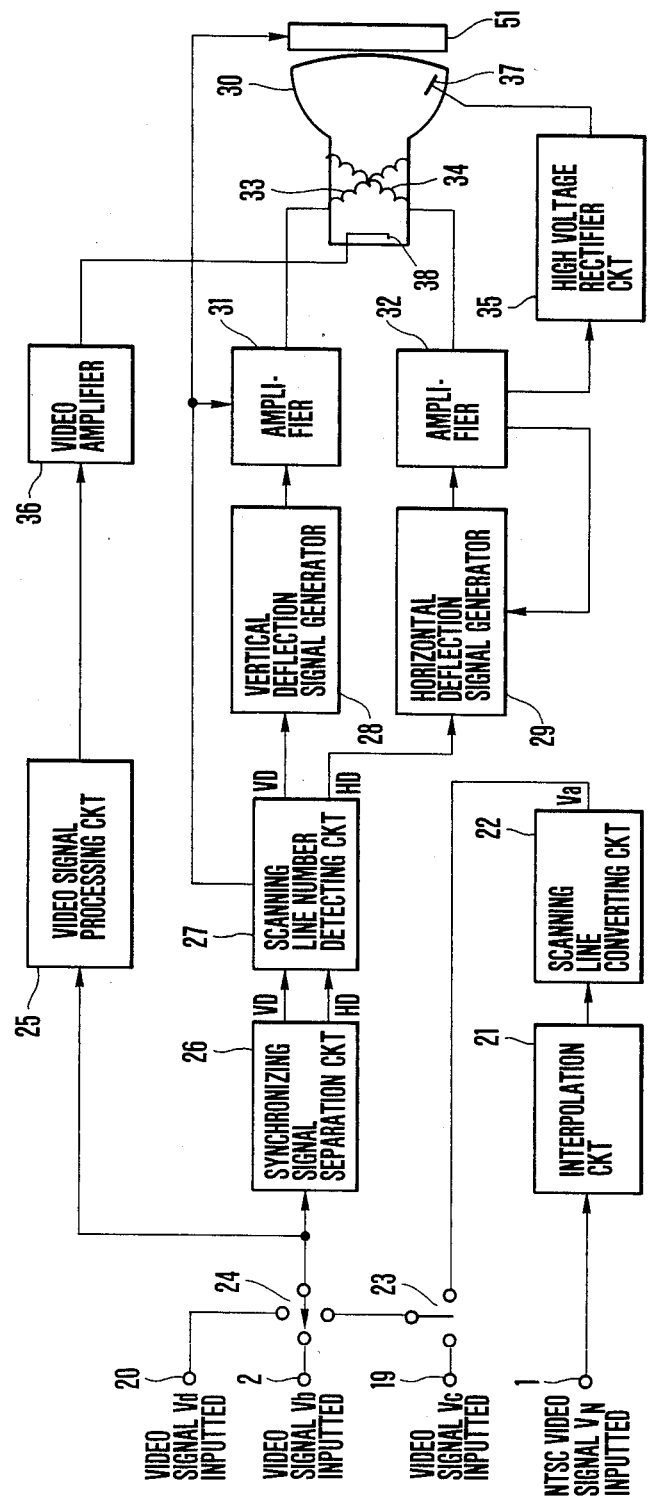
FIG. 6 is a schematic diagram of a third embodiment of the picture output device according to the present invention.

FIG. 6 is a diagram schematically illustrating the construction of a third embodiment of the invention. In the following by using FIG. 6, the third embodiment of the invention will be explained. For note, in FIG. 6, the parts denoted by the same reference characters as those of FIG. 2 represent the similar parts to those of FIG. 2, and their detailed explanation is omitted.

The embodiment shown in FIG. 6 is different from the embodiment shown in FIG. 2 in that an output picture masking device 51 is added.

In FIG. 6, similarly to FIG. 2, as the variety of kinds of video signals can be entered, when the received input signal is determined to be the Vd by the scanning line number detecting circuit 27, the output picture masking device 51 is driven.

Figure 7:
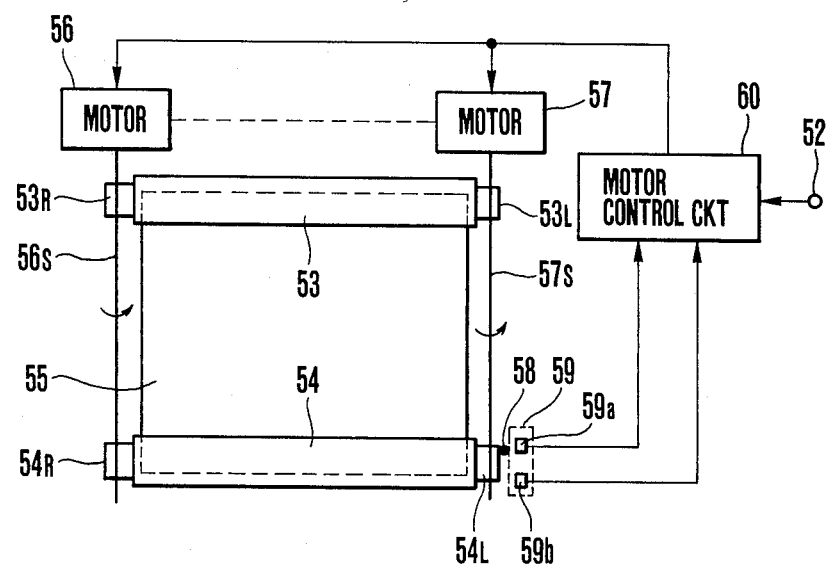
FIG. 7 is an elevational view, partly in block form, of a practical example of the masking means on the display of FIG. 6.

Here, we explain about the output picture masking device 51. FIG. 7 is a diagram illustrating a concrete example of the output picture masking device 51. An input terminal 52 is connected to the output of the scanning line number detecting circuit 27 such as that shown in FIG. 4. Mask plates 53 and 54 are arranged along the upper and lower sides of the fluorescent screen 55 of the CRT respectively, and are driven to move vertically by common motors 56 and 57 through shafts 56s and 57s respectively.

Figure 8:
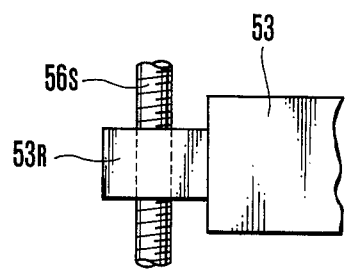
FIG. 8 is a fragmentary view illustrating the details of a mask plate drive mechanism of FIG. 7.

In more detail, as shown in FIG. 8, both ends of each of the mask plates 53 and 54 are provided with support members 53R, 53L, 54R and 54L each having a screw-threaded penetration hole formed therein. The directions of screwing of the mask plates 53 and 54 are opposite to each other so that when the mask plate 53 moves downward, the mask plate 54 moves upward.

Now assuming that the mask plates 53 and 54 are not covering the fluorescent screen 55 of the CRT at all, then when the signal Vd is received, the signal of high level appears at the input terminal 52 as has been described before. Responsive to this signal, a motor control circuit 60 drives the motors 56 and 57 so that the mask plates 53 and 54 move downward and upward respectively. When they have covered the upper and lower margins of the fluorescent screen 55 each in ⅛ of the vertical length thereof, a position indexing element 58 on the support member 54L is aligned with a sensor 59a. So, the sensor 59a produces a de-actuating signal which is then applied to the motor control circuit 60, thereby the motors 56 and 57 are stopped. In such a way, for the input of the video signal whose aspect ratio is 3:5, ⅛ of the vertical length of the fluorescent screen 55 from the upper or lower side thereof is covered by the mask plate 53 or 54 respectively, leaving only the effective area to display the picture therebetween.

Also, with the mask plates 53 and 54 in such positions, when the received input is changed from the signal Vd to one of the signals Vb, Vc and $V_N$, a signal of low level appears at the terminal 52. For now, the motors 56 and 57 are rotated in the reverse direction to that described in connection with the first case. When the mask plates 53 and 54 have fully retracted from the fluorescent screen 55, the indexing element 58 is aligned with another sensor 59b. So, this sensor 59b produces a de-actuating signal which is applied to the motor control circuit 60, thereby the motors 56 and 57 are stopped. Thus, for the input of the video signal whose aspect ratio is 3:4, the entire area of the fluorescent screen 55 is exposed to display the picture.

Next, another case wherein as the CRT 30 use is made of a CRT adapted for use with the high-definition television signal, that is, the aspect ratio of 3:5 will be explained. For this case, only when the input signal is the signal Vd, the picture output is carried out in the usual way. When it is one of the signals Vb, Vc and $V_N$, the gain of the amplifier 32 for the output of the horizontal deflection signal generator 29 is changed to 4/5 of the normal value. The output picture masking device 51 is also modified so that the left and right hand margins of the fluorescent screen 55 are masked each in 1/10 of the horizontal length thereof. The others are similar to those shown in FIG. 6.

For example, if the scanning line number detecting circuit 27 is the same as that shown in FIG. 4, the gain of the amplifier 32 is changed to 4/5 of the normal value when the signal representing the detected number of scanning lines changes from high to low. Also, the mask plates are moved to cover 1/10 of the fluorescent screen 55 from each of the left and right hand sides.

The use of the above-described features enables the CRT for the high-definition television signal to output the video signal of 3:4 aspect ratio as shown in FIG. 5. That is, the effective picture display is presented in that portion of the fluorescent screen which is shown white, while the remaining portions hatched are masked by the mask plates.

According to the picture output device of the character described above, even when a video signal whose aspect ratio does not match the shape of the picture display or CRT is received, the user can view the displayed picture without an unpleasant or awkward impression.

For note, though in the above-described embodiment, the masking means for the picture display is constructed in the mechanical form, it is to be understood that an optical form may be employed. For example, light-shutter means is arranged over the fluorescent screen and its upper and lower, or left and right hand portions of ⅛ or 1/10 in length are energized or de-energized.

What is claimed is:
1. A picture output device comprising:
 (A) input means at which a first picture signal of horizontal scanning repeated n times within the vertical scanning period, a second picture signal of horizontal scanning repeated m (m>n) times within the vertical scanning period and a different aspect ratio from that of said first picture signal, a third picture signal of horizontal scanning repeated kn times (where k is 2 or higher an integer) within the vertical scanning period and an equal aspect ratio to that of said first picture signal can enter;

(B) scanning converting means receptive of said first picture signal inputted from said input means for producing an output representing that the number of times the horizontal scanning is repeated within the vertical scanning period is converted to k×n;

(C) display means capable of displaying a picture based on the picture signal; and (D) display operation control means for selectively supplying said second picture signal, said third picture signal and said converted first picture signal by said scanning converting means to said display means, and for controlling the display operation of said display means in accordance with the number of times the horizontal scanning is repeated within the vertical scanning period of the supplied one of said picture signals.

2. A device according to claim 1, wherein said scanning changing means includes:

(A) interpolation-processing means for interpolation-processing said first picture signal inputted from said input means; and (B) compressing means for compressing the time axis for every one horizontal scanning period of the interpolation-processed first picture signal by said interpolation-processing means.

3. A device according to claim 2, wherein said interpolation-processing means includes a line interpolation circuit.

4. A device according to claim 2, wherein said compressing means is arranged so that the time axis of the interpolation-processed first picture signal is 1/k times as long as before the compression.

5. A device according to claim 1, wherein said display operation control means includes:

(A) synchronizing signal separating means receptive of the picture signal inputted from said input means for producing the horizontal and vertical synchronizing signals;

(B) counting means for counting the number of horizontal synchronizing signals in one vertical synchronizing period of the separated vertical synchronizing signal by said synchronizing signal separating means; and (C) display operation control signal generating means for producing a control signal for the display operation of said display means depending on the counted value in said counter means.

6. A device according to claim 5, wherein said display means is arranged so as to display a picture in a aspect ratio depending on the display operation control signal generated from said display operation control signal generating means.

7. A device according to claim 5, wherein said display means includes:

(A) a vertical display range setting circuit responsive to the vertical synchronizing signal separated by said synchronizing signal separating means for setting a display range of vertical direction of the displayed picture in the display area; and (B) a horizontal display range setting circuit responsive to the horizontal synchronizing signal separated by said synchronizing signal separating means for setting a display range of horizontal direction of the displayed picture in the display area.

8. A device according to claim 7, wherein said display means includes a display portion capable of displaying a picture based on the aspect ratio of said third picture signal.

9. A device according to claim 8, wherein said vertical display range setting circuit is arranged to change over the display range of vertical direction in response to said display operation control signal.

10. A device according to claim 7, wherein said display means includes a display portion capable of displaying a picture based on the aspect ratio of said second picture signal.

11. A device according to claim 10, wherein said horizontal display range setting circuit is arranged so as to change over the display range of horizontal direction in response to said display operation control signal.

12. A device according to claim 1, wherein said display operation control means includes:

(A) synchronizing signal separating means for separating horizontal and vertical synchronizing signals from the picture signal which enters said input means;

(B) counting means for counting the number of horizontal synchronizing signals in one vertical synchronizing period of the vertical synchronizing signal separated by said synchronizing signal separating means;

(C) determining signal generating means responsive to the counted value of said counting means for determining whether the picture signal entering said input means is the first picture signal or the second picture signal to produce a determining signal;

(D) a vertical display range setting means responsive to the vertical synchronizing signal separated by said synchronizing signal separating means for setting a display range in the vertical direction for the displayed picture in the display area; and (E) a horizontal display range setting means responsive to the horizontal synchronizing signal separated by said synchronizing means for setting a display range in the horizontal direction for the displayed picture in the display area.

13. A device according to claim 12, wherein said display means includes a display portion for displaying a picture based on the aspect ratio of the first picture signal.

14. A device according to claim 13, wherein said vertical display range setting circuit is operative to change the display range in the vertical direction in response to said determining signal.

15. A device according to claim 14, wherein said picture output device further comprises masking means for masking portions of said display area other than the display portion corresponding to said determining signal.

16. A device according to claim 12, wherein said display means includes a display portion for displaying a picture based on the aspect ratio of said second picture signal.

17. A device according to claim 16, wherein said horizontal display range setting circuit is operative to change the display range in the horizontal direction in response to said determining signal.

18. A device according to claim 17, wherein said picture output device further comprises masking means for masking portions of said display area other than the horizontal display portion corresponding to said determining signal.

* * * * *